United States Patent Office 3,505,513
Patented Apr. 7, 1970

3,505,513
PIPELINE LEAK DETECTION
Michael Lawrence Fowler, Hertford, and William Vallance and Martin Myer Newman, London, England, assignors to International Standard Electric Corporation, New York, N.Y., a corporation of Delaware
Filed May 31, 1968, Ser. No. 733,346
Claims priority, application Great Britain, June 23, 1967, 29,114/67
Int. Cl. G06f 15/20, 15/56; G06g 7/50
U.S. Cl. 235—151.34                                    15 Claims

ABSTRACT OF THE DISCLOSURE

Leakage in pipelines is detected by integrating measurements of flow at input and output ends and periodically comparing these at a data processing point which sets off an alarm when a predetermined discrepancy has occurred more than a given number of times. The flow measuring devices produce electrical pulses at a rate proportional to the rate of flow.

BACKGROUND OF THE INVENTION

This invention in general relates to a supervisory arrangement for a conveying means and more particularly for pipelines conveying liquids.

The arrangement provided substantially overcomes the disadvantages of the prior art systems which utilize instantaneous measurements, thereby assuming a hydraulic stability which is unlikely to be attained in practice. The digital processing employed reduces the likelihood of errors to a very low level.

SUMARY OF THE INVENTION

According to the invention in its most general form there is provided a supervisory arrangement for an elongated conveying means, comprising first and second flow rate measuring devices at first and second points respectively defining a section of said conveying means, control means to render each measuring device operative for a predetermined period and to cause an indication of the quantity of material conveyed past the respective point during said period to be transmitted to an individual input of a comparator, which comparator produces an alarm signal on the indications differing by more than a predetermined value.

Acording to the invention there is also provided a flow monitoring circuit arrangement for a pipeline conveying a fluid, including a master station linked by one or more transmission paths to at least two outstations, wherein each outstation comprises a meter at an individual point along the pipeline, which meter in response to the rate of flow at its respective individual points feeds electrical impulses to a register and wherein the master station comprises a stored program means to generate control commands, which commands when transmitted over said transmission paths cause individual outstations to register said impulses for a predetermined period and to transmit the number of the registered impulses to a subtractor at the master station which is provided with a first store coupled to the output of the subtractor and a source of a signal representing a predetermined value of the difference between the numbers of said registered impulses at two of said outstations which subtractor produces a signal on said difference exceeding said predetermined value.

BRIEF DESCRIPTION OF THE DRAWINGS

Embodiments of the invention will now be described with reference to the accompanying drawings in which.

DESCRIPTION OF THE PREFERRED EMBODIMENTS

The embodiments described hereafter are for pipelines; however, the invention is applicable to any conveying means e.g. a belt conveyor for discrete articles or granular substances in bulk. The rate at which material enters or leaves a defined section of conveying means may be determined by counting discrete articles or by using load cells to weigh bulk substances at each end of that section.

Figure 1:
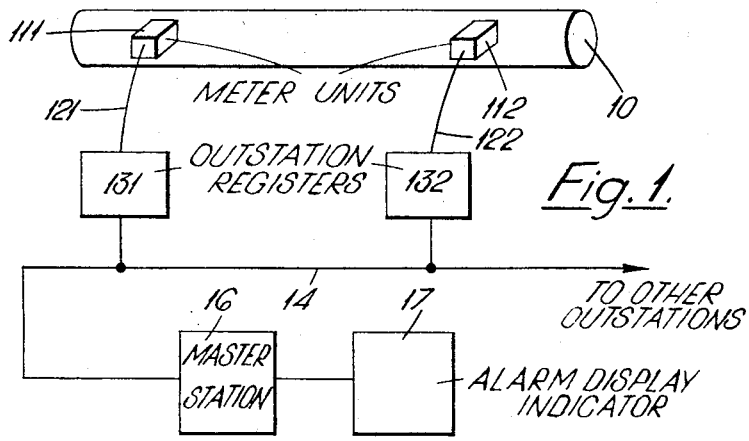
FIG. 1 is a block schematic diagram of an arrangement embodying the invention.

Referring to FIG. 1 a pipe line 10 is provided with two meter units 111, 112 each responsive to the liquid or gas flowing in the pipe, and each producing an electrical impulse on the flow of one unit of liquid or gas. Each meter is connected to its respective outstation by a screened cable 121, 122. The outstations are connected through a transmission path 14 to a master station 16 and an alarm display indicator 17.

Figure 2:
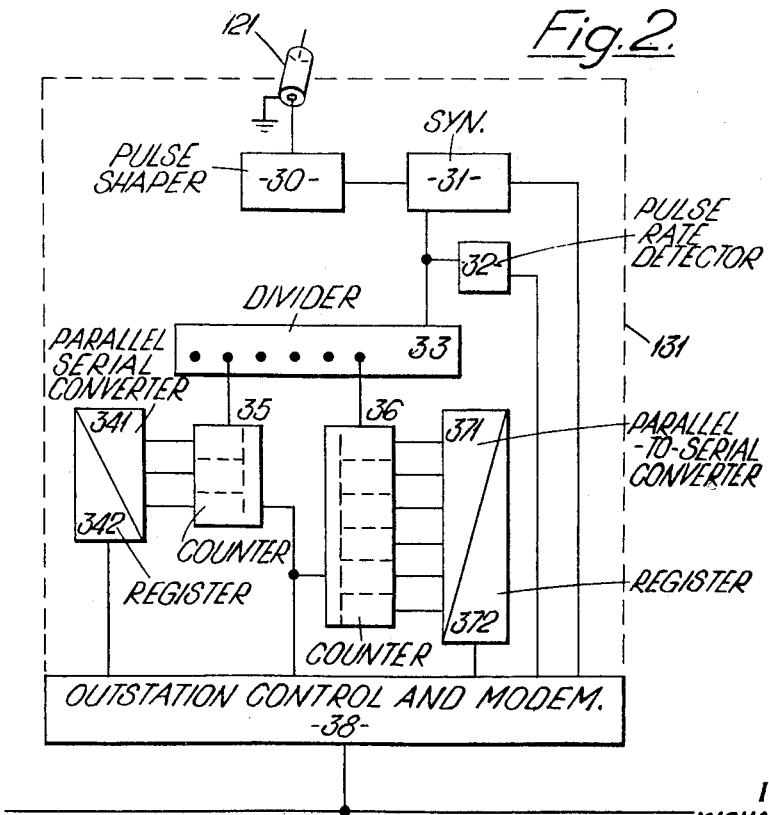
FIG. 2 is a block schematic diagram of an outstation in the arrangement of FIG. 1.

Referring to FIG. 2 the meter output through the screened cable is supplied to a pulse shaper 30 and the shaped pulses supplied to a synchronizer 31. The master station 16 in FIG. 1 of the arrangements produces in addition to interrogation and control signals a timing wave supplied through transmission path 14 to all outstations. Each outstation includes a modem and control unit 38 through which the timing wave is derived from the signals on the line 14.

The timing wave is supplied to the synchronizer 31 in which each shaped meter impulse is converted to a pulse of one timing wave cycle duration synchronized with the timing wave cycle leading edge. As the timing wave is preferably of a frequency at least an order greater than the highest impulse rate from the meter, the synchronizer causes no distortion of the meter pulse rate.

A low pulse rate detector 32 causes an alarm to be transmitted to the control and modem unit 38 if the pulse rate falls below a preset value for a present period. This alarm will be transmitted to the master station 16 when the outstation is interrogated by the master station.

The pulses from the synchronizer are supplied to a divider 33, from which they are supplied to counters 35, 36. Divider 33 divides the pulse rate down, by factors of 10, to a rate suitable to the capacity of the counters and the frequency of the interrogation and transmission of the count to the master station. The number in counter 36 is the cumulative total of pulses that have been received from the divider. Counter 35 is reset to zero each time the master station interrogates the outstation to determine the numbers counted. Thus the number in counter 35 is the total of meter pulses received from the divider between successive interrogations. Each counter has a parallel-to-serial converter 341, 371, respectively, and associated with each converter is a register 342, 372.

In one embodiment of the invention the digits in the number in each counter are stored separately in binary coded decimal form. The number in each counter is transferred to the respective register on the receipt of an interrogation signal from the master station 16 via the outstation control and modem unit 38, being converted to serial form for transmission. The registers hold the numbers in the serial form until they have been successfully transmitted to the master station 16, in serial binary coded decimal form.

Figure 3:
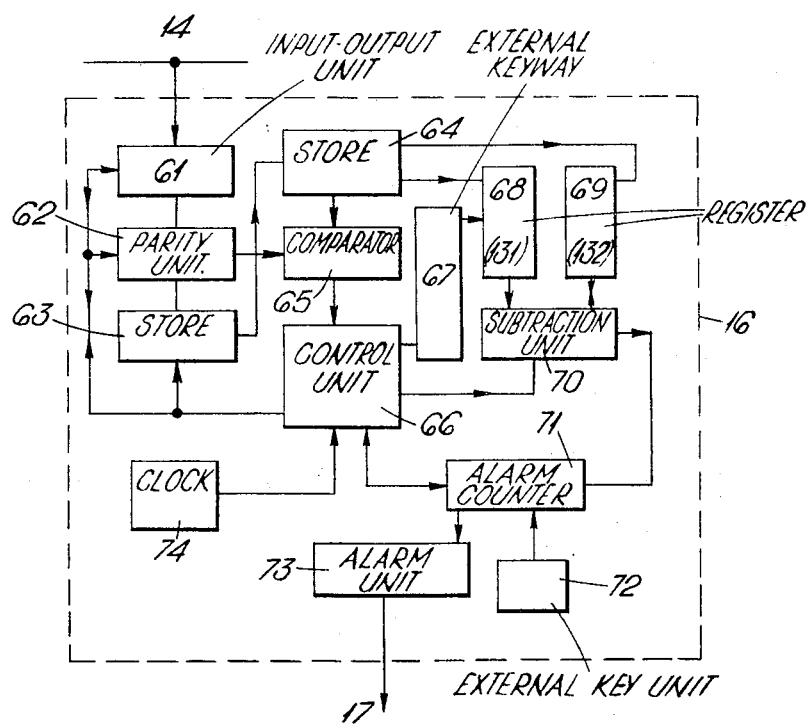
FIG. 3 is a block schematic diagram of the master station in the arrangement of FIG. 1.

The master station 16 contains in store 64 registers corresponding to the individual registers e.g. 342, 372, at each outstation. The master station also includes a stored program of instructions which determine the order in which the outstations are interrogated and operations carried out on the information received from these outstations. A clock 74 (FIG. 3) in the master station produces the timing wave and also determines the time intervals which are combined with the stored program instructions to form the interrogation commands for the outstations.

These commands are arranged so that outstations 111, 112 will be interrogated consecutively. However, as registers are provided at the master station for each outstation interrogation may take place in any convenient order, allowing other functions of the control station to be carried out.

The transmission method used for signalling along the transmission path 14 is now described. In all supervisory and data logging systems security of transmission of commands and readings is of prime importance. A variety of signal transmission media may be used to carry the information including wire, radio waves, microwave links, optical waveguides or laser beams. All these add noise to the signals being transmitted and an error checking transmission system is desirable. In addition a two stage check may be used when any control instruction is sent to an outstation. The outstation addressed, on receipt of the instruction, selects the operation represented by the instruction and sends to the master station a signal representing the operation selected. If this signal is received by the master station within a specified time, and corresponds with the instruction originally sent, a further signal is sent to the outstation to indicate that the operation selected is to be performed. When numerical information, say a meter reading, is being transmitted from an outstation to the master station the data, after successfully completing a parity check in parity unit 62 is compared by comparator 65 with the reading previously received and stored in the respective register in store 64. If the new reading is same as previous reading then the new reading is accepted. If different the new reading is stored temporarily in store 63 and the retransmission of the reading from the outstation requested by control unit 66. If the retransmitted reading, after parity checking, agrees with the temporarily stored reading the reading is accepted and supplied to the appropriate register in store 64. These arrangements provide a transmission method of considerable security. In addition each transfer of information within the master station is supervised by a counter to ensure that only the correct number of digits is transferred.

If any transmission failure or error occurs in connection with a timed interval all transmissions are cancelled and the sequence restarted or repeated at a later time.

The sequence of events during interrogation of an outstation is now described. The use of the transmission method described above is assumed. The interrogation instruction is sent through the master station modem, demodulated in the outstation modem and applied by the outstation control to the counters 35, 36 and their respective registers and counters. The control signal transfers the counts to the counters 341, 371 and registers 342, 372 and intimates the serial transmission of the contents of the register. This transmission is coded in the outstation control 38 and, if desired, parity characters are added. The counts are held in the registers until the master station 16 accepts the counts and alters its own register 64 accordingly. The data received from the outstations by control unit 16 forms the basis of several calculations of the state of the pipe line and also provides information which initiates action by the program stored in the control unit.

The flow information received from an outstation indicates how much liquid has flowed past that outstation's meter in a predetermined period. This period is the same for the flow information received by the control unit from consecutive outstations on the pipe line for corresponding interrogations. Under the control of the program stored in control section 66 the accepted flow information values from the master station register 64 are inserted into the individual registers 68, 69 associated with a subtraction unit 70. The contents of the subtraction register are checked for accuracy and then the subtractor obtains the difference between the numbers in the registers and stores the result in one of the registers 69. The maximum permitted difference between the flow information value is inserted into register 68 either by the stored program or by external key unit 67, and the subtractor obtains the difference between these numbers. If this second subtraction indicates a difference between the flows at consecutive outstations greater than the permitted value a signal is sent to alarm counter 71 to indicate a possible leak in the pipe line between the two outstations. This alarm counter on receipt of a given consecutive number of such alarms causes further visual and audible alarms to be given by unit 73 in conjunction with display unit 17. These letter alarms also cause the pipe line to be shut down in certain cases through control unit 65.

In an embodiment of the invention the flow information values are four digit numbers in which each digit is in binary coded decimal form and includes four bits. The subtraction is done serially by digits but in parallel within the digits. The subtractor consists of a four bit parallel binary subtractor, gates to convert the result from binary to binary coded decimal, and an interdigit borrow store. The inter-digit store stores the values of the borrow between except at the fourth digit when the borrow is stored in a control bistable known as the sign store.

These two stores are necessary because at the start of the subtraction it is not known which of the two numbers is the greater. Thus it may be that the greater is being subtracted from the lesser and a borrow will be required at the end of the subtraction. This is detected by the sign store which causes another subtraction to be done; subtracting this first result from zero. The borrow which was detected by the sign store is not put in the borrow store and so does not affect the count. Thus the second difference is the same as would have been achieved in one subtraction had the numbers been the other way round initially.

The predetermined limiting value of the second difference is inserted just before the last shift of the register in either the first or second subtraction depending on whether 1 or 2 substractions are required as explained above. This insertion is controlled by the same signals which thus "set" or "do not set" the sign store.

The operation of the subtractor is as follows: the subtractor gates are fed from the shift register through which the the numbers are successively shifted under control of the sign store, the subtraction counter and the subtraction control. This is done once or twice depending on which of the numbers being subtracted is greater. Then a permitted second difference value is inserted and the previous result is subtracted from it. If the result, the final difference, is greater than the permitted value an alarm is initiated.

If correct operations in the pipeline, for example the use of pumps, have caused the flow between outstations to vary, the pipeline must be prevented from shutting down. The alarm counter can therefore be arranged only to respond to consecutive alarms occuring over a period of time longer than the stabilization time of the pipeline. The alarm counter 71 can receive this information either from the stored program or from an external key unit 72. However an alarm may be sounded to indicate the correct functioning of the subtractor.

The flow information from one outstation on successive interrogations can be used to determine the rate of change of flow. This calculation is performed in a similar manner to that described above. The information in registers 68, 69 will however be successive readings from the same outstation and the number fed to register 68 after the first subtraction (the limiting value of the second difference) will now be the maximum permissible rate of change of flow. Similar alarm arrangements are also provided.

The intervals between the rate of change of flow and leak calculations are adjusted to suit the particular pipe line characteristic and use. Suitable intervals have been found to be in the order of tens of seconds for the rate of change of flow and minutes for the leak detection. The stored program can contain instructions to adjust these intervals in response to control operations on the pipe line.

We claim:

1. A supervisory arrangement for an elongated conveying means, comprising first and second flow rate measuring devices at first and second points respectively defining a section of said conveying means, control means to render each measuring device operative for a predetermined period and to cause an indication of the quantity of material conveyed past the respective point during said period to be transmitted to an individual input a comparator, which comparator produces an alarm signal on the indications differing by more than predetermined value, and said control means includes a store for a program of control instructions for rendering the devices operative for the predetermined period.

2. A supervisory arrangement as claimed in claim 1 in which a flow rate measuring device includes a register responsive to the indication.

3. A supervisory arrangement as claimed in claim 2 in which on the receipt at an outstation of a control instruction rendering a measuring device operative the registration of a volume indication is commenced and continued to the end of the predetermined period.

4. A supervisory arrangement as claimed in claim 1 in which the comparator includes a register associated with each measuring device.

5. A supervisory system as claimed in claim 4 wherein the comparator comprises a subtractor for deriving the arithmetic difference between the indications stored in each of said two registers and storing a signal representative of said difference in one register.

6. A supervisory system as claimed in claim 5 wherein the subtractor comprises means for shifting the indications through the respective registers to subtractor gates to derive a difference, a store to hold the sign of the difference, means responsive to a negative stored sign to cause the difference to be subtracted from zero to produce a positive difference, means responsive to a positive difference to insert said positive difference into said one register, means to insert said predetermined value in said other register and means for shifting said positive difference and said predetermined value through the respective registers to the subtractor gates to determine which contains the larger number and means responsive to said one register containing the larger number to generate said alarm signal.

7. A supervisory system as claimed in claim 1 including at the measuring device a store for the indication and at the comparator a store containing a record of previously received indications from each measuring device together with means for temporarily storing and comparing an indication received from a device with an indication previously received from that device and means differing from the previous indication to cause the device to retransmit the indication which retransmitted indicaton is then compared with the temporary stored indication which indication is accepted to replace the prevously received indication only if the two transmitted indications agree.

8. A flow monitoring circuit arrangement for a pipe line conveying a fluid, including a master station linked by one or more transmission paths to at least two outstations, wherein each outstation comprises a meter at an individual point along the pipe line, which meter in response to the rate of flow at its respective individual point feeds electrical impulses to a register and wherein the master station comprises a stored program means to generate control commands, which commands when transmitted over said transmission paths cause individual outstations to register said impulses for a predetermined period and to transmit the number of the registered impulses to a subtractor at the master station which is provided with a first store coupled to the output of the subtractor and a course of a signal representing a predetermined value of the difference between the numbers of said registered impulses at two of said outstations which substractor produces a signal on said difference exceeding said predetermined value.

9. An arrangement as claimed in claim 8 in which electrical impulses from the meter are shaped and then synchronized with a timing waveform.

10. An arrangement is claimed in claim 9 in which the outstation includes a resettable counter and a cumulative counter each responsive to the synchronized impulses.

11. An arrangement as claimed in claim 10 in which a first control command causes the resettable counter to reset to zero and then commence to count the synchronized impulses subsequently received, and a second command, after an interval of the predetermined period causes the resettable counters to transfer the number of the so counted impulses to a register for transmission to the master station.

12. An arrangement as claimed in claim 8 in which the master station includes a second store to contain the number transmitted from a register at an outstation in response to a previous control command to that outstation, and in which the master station includes error checking means whereby on the receipt of a different further number from the respective outstation register a control command is transmitted to the outstation to cause the outstation to transmit the further number from its register, which transmitted number is compared with the stored previously received number, and if the same, is inserted into the store in place of the stored previously received number.

13. A flow monitoring circuit arrangement as claimed in claim 8 in which there is provided a parallel binary coded decimal counter responsive to the number of electrical impulses from the meter, a parallel to serial converter and a register for a serial binary coded decimal number, which converter, on receipt of a control command is coupled to supply the number in the counter to the register.

14. A flow monitoring circuit arrangement as claimed in claim 8 in which transfer means for the numbers at the master station include digit counting means to count the digits transferred and to indicate when an incorrect count is obtained.

15. A flow monitoring circuit arrangement as claimed in claim 8 in which the number of impulses registered at each substation is supplied to the master station in binary coded decimal form and in which the master station includes a shift register for all the digits in the number registered at each of said two outstations a binary subtractor to subtract in parallel the bits in each digit and to operate on the digits in series, gates to convert the binary coded decimal, an interdigit borrow store, a sign store repsonsive to the value of the inter-digit borrow between the most significant and the next significant digits.

References Cited

UNITED STATES PATENTS

| | | | |
|---|---|---|---|
| 2,828,479 | 3/1958 | Jackson | 340—239 |
| 3,196,679 | 7/1965 | Howland | 340—239 XR |
| 3,308,660 | 3/1967 | De Ford | 73—194 |

LOUIS R. PRINCE, Primary Examiner

W. A. HENRY II, Assistant Examiner

U.S. Cl. X.R.

73—40, 196; 340—242